United States Patent [19]

van Rassel

[11] Patent Number: 4,697,277
[45] Date of Patent: Sep. 29, 1987

[54] SYNCHRONIZATION RECOVERY IN A COMMUNICATIONS SYSTEM

[75] Inventor: William F. van Rassel, Ontario, Canada

[73] Assignee: Scientific Atlanta, Inc., Atlanta, Ga.

[21] Appl. No.: 704,024

[22] Filed: Feb. 21, 1985

[51] Int. Cl.$^4$ .......................... H04L 7/00; H04N 7/00
[52] U.S. Cl. .................................. 375/116; 375/106; 375/114; 358/146
[58] Field of Search ............... 375/116, 114, 113, 110, 375/115, 111; 370/105, 106; 358/148, 150, 146, 147

[56] References Cited

U.S. PATENT DOCUMENTS

| | | | |
|---|---|---|---|
| 3,576,947 | 5/1971 | Kruger | 375/116 |
| 3,591,720 | 7/1971 | Othmer | 370/106 |
| 3,757,044 | 9/1973 | Verhoeckx et al. | |
| 3,808,367 | 4/1974 | Wigner et al. | 375/114 |
| 3,855,576 | 12/1974 | Braun et al. | 375/116 |
| 4,001,693 | 1/1977 | Stackhouse et al. | 375/116 |
| 4,131,761 | 12/1978 | Giusto | 375/114 |
| 4,424,532 | 1/1984 | den Toonder et al. | |
| 4,468,752 | 8/1984 | Chatham | 375/110 |
| 4,506,372 | 3/1985 | Massey et al. | 375/116 |

FOREIGN PATENT DOCUMENTS 0009452  1/1983  Japan ................................. 375/114

Primary Examiner—Robert L. Griffin
Assistant Examiner—M. Huseman
Attorney, Agent, or Firm—Banner, Birch, McKie & Beckett

[57] ABSTRACT

Synchronization between a transmitter and a receiver is effected by encoding and transmitting a synchronization pulse as a series of m first waveforms followed by a series of n second waveforms. The first and second waveforms are of the same duration and are transmitted in phase with each other; and m and n are positive real numbers, with m greater than one. The second waveform is different from, and preferably negatively correlated with, the first. When the receiver detects a series of first waveforms in the received signal, it locally generates a series of (either first or second) waveforms and correlates the locally-generated signal with the received signal. A change in correlation is detected as the synchronization pulse.

13 Claims, 6 Drawing Figures

SYNCHRONIZATION RECOVERY IN A COMMUNICATIONS SYSTEM

TECHNICAL FIELD

The invention is concerned with synchronizing a transmitter and receiver between which data are being transferred. "Synchronization" involves two aspects, both of which are embraced within the term as used here. One aspect of synchronization (sometimes referred to as "framing") ensures that slots in the received time sequence will be correctly associated with the appropriate positions in the transmitted time sequence. The other aspect (synchronization properly so called) implies that the transmitter and receiver clocks are locked to one another, so that bit integrity is maintained.

BACKGROUND OF THE INVENTION

Many types of communications require that a transmitter and receiver be synchronized. For example, in time-division multiplex transmission of independent digital bit streams, synchronization is necessary to correctly interpret the value of the incoming signal as one member of the transmitted symbol set and to direct the interpreted symbol to the correct receiver. Likewise, in television transmission, picture elements displayed at the receiver must be in the same relative positions as those appearing at the transmitter; and, for a line-and-field scanned television signal (one in which the picture being transmitted is scanned in fields of adjacent parallel lines), synchronization is necessary to achieve this.

The most common method of synchronizing television is by means of a horizontal synchronization pulse, of prescribed characteristics, in the horizontal blanking interval (HBI) of each line, and a set of vertical synchronization pulses, of different prescribed characteristics, in the vertical blanking intervals (VBI) between fields. In the receiver, these pulses are separated, from the picture information and from each other, and used to control the horizontal and vertical deflection oscillators which direct the picture tube's electron beam.

At times, however, it is desirable to eliminate at least the horizontal synchronization pulses from the television signal. This may be done in order to prevent reception of the signal (as in pay television) or to free the horizontal blanking interval for use in carrying other data, such as the audio portion of the television program. In either case, only the synchronization information transmitted in the vertical blanking interval is then available to synchronize the transmitter and receiver. A typical system uses a single synchronization pulse during the VBI and develops all control signals for deflection oscillators from this single synchronization pulse via counters actuated by an extremely accurate clock.

Where digital audio channels are multiplexed with the picture information during the horizontal blanking interval, a clock and data recovery system must exist in the receiver for the audio. This clock and data recovery system can also be used for synchronization recovery in the vertical blanking interval provided a digital synchronization word is used which employs the same clock. The simplest, and hence most desirable, method of synchronization would therefore be based on recovery of synchronization from a digital word in the vertical blanking interval.

Because of the absence of any line synchronization pulses in such a system, synchronization information is available only once each field. It is therefore extremely important that this infrequent synchronization information be reliably received, even in the presence of noise; for the instant of synchronization is the instant at which all system counters in the receiver are reset to zero. Failure to reset at the proper instant would perpetuate and magnify errors and eventually result in complete loss of the picture.

SUMMARY OF THE INVENTION

An object of the present invention is to synchronize a transmitter and receiver between which data are being transferred.

Another object of the invention is to encode synchronization information in a transmitted signal in such a way as to enable it to be reliably recovered at a receiver in the presence of noise.

Another object of the invention is to reliably recover synchronization information from a received signal in the presence of noise.

At the transmitter, the synchronization pulse whose leading or trailing edge, typically, is used as datum for the various operations (such as multiplexing data sources or scanning the storage target of a television camera) is encoded as a series of repeated code patterns (electrical waves) which may be either analog waveforms or digital words. The series includes two patterns. The first code pattern, P, is generated m times (m is a real number greater than one). Following that, the second code pattern, Q, the same length (duration) as P, is generated n times (n is a positive real number), in phase with the m occurrences of P. P and Q must be different waveforms and preferably have a strong negative correlation with each other. If they are binary digital words, each is preferably the complement of the other. The instant of synchronization (the datum) is the instant between the last (the mth) first code pattern P and the first one of the second code patterns Q. This instant, for example, may be a unique point in a 262.5-line field of NTSC television.

At the receiver, the series of code patterns representing the synchronization pulse is decoded to recover the synchronization information. Because the encoded synchronization signal is part of a larger stream of information, the received signal must first be examined to identify occurrences of the first code pattern P. This is done by dividing the received signal into portions which are the same length as the P (or Q) code pattern, adding the portions, and comparing the sum to the first code pattern P. When the comparison reveals that the sum is made up of a number of first code patterns P, the encoded synchronization signal has been located.

This process of dividing the received signal into portions of the same length as a code pattern and adding the portions is important in distinguishing the encoded synchronization signal from the noise in which it is embedded. It can be shown, that as successive portions of a repetitive incoming signal (such as the first code pattern) plus noise are added, the ratio of signal power (S) to noise power (N) increases. See, e.g., Petr Beckman, *Probability in Communication Engineering*, New York, Harcourt, Brace & World, Inc., 1967, pp. 272-274. When S/N becomes large enough that the first code pattern can be identified in the received signal, it is then possible to detect the encoded synchronization signal despite its ostensible concealment by noise.

While detecting the existence of the first code pattern P, the invention is also able to determine its phase. Then a series of representations of either the first code pattern P or the second code pattern Q (it does not matter which) is locally generated, in an appropriate phase relationship with the detected first code pattern. Usually, it is sufficient if the locally generated code patterns are in phase with the incoming code patterns.

These locally generated code patterns, which are error-free, are compared with the incoming signal in a correlator. (If the locally generated code patterns are first code patterns P, the output of the correlator will be high while the first code pattern is being repeated m times in the incoming signal; if the locally generated code patterns are second code patterns Q, the correlator's output will be low during that time.) When the correlator's output changes (from high to low, or vice versa, depending upon which pattern is locally generated), the change is detected as the synchronization signal, or datum.

The synchronization signal may then be used in any appropriate manner for synchronizing the receiver with the transmitter. For example, it may be used as the global reset signal for all of the counters which control horizontal and vertical sweep oscillators and demultiplexers.

DETAILED DESCRIPTION OF THE PREFERRED EMBODIMENT

The preferred embodiment of the invention is described in connection with a Multiplexed Analog Component (MAC) television system. The MAC composite color television signal, like the NTSC signal, transmits luminance and chrominance information separately. Unlike the NTSC signal, however, in MAC the luminance and chrominance portions of the television signal are both modulated onto the same carrier. They are separated not by frequency but by time. Each horizontal line containing picture information in a MAC television signal comprises three parts: the horizontal blanking interval (HBI), the chrominance signal, and the luminance signal. No picture information is transmitted in the HBI; but synchronizing signals or audio information may be carried there. Either the chrominance signal or the luminance signal or both may be time-compressed before transmission and decompressed after reception. MAC television, in general, is well known in the art.

Figure 1:
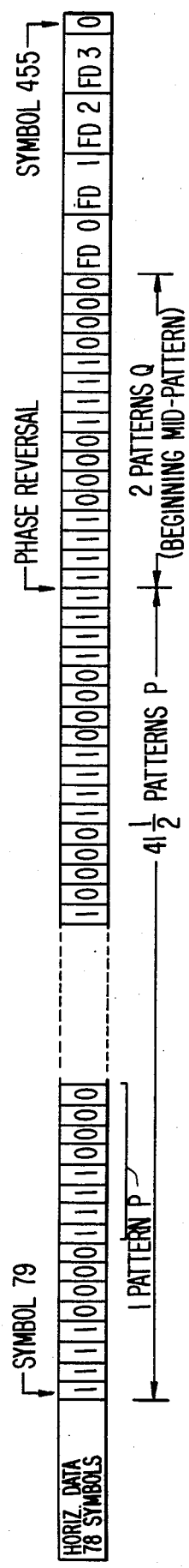
FIG. 1 is a diagram of the data (including synchronization information) transmitted in the vertical blanking interval (e.g., line 2) in one MAC television format.

In one MAC television format, synchronization information is transmitted during line 2 of the vertical blanking interval. FIG. 1 is a diagram of the data transmitted in line 2 in this format. The line is divided into 455 symbols each requiring 139.7 ns (symbols occur at a frequency of 7.157 MHz). The 455 symbols then occupy a standard television line of 63.56 us. The first 78 symbols, 10.90 us, fill the horizontal blanking interval and continue to carry, during the vertical blanking interval, the same type of information (such as audio) which they carried during the vertical scan. The remaining symbols in line 2 of the VBI are for the most part devoted to synchronization.

Beginning with symbol 79, a series of first code patterns P is transmitted. The first code pattern P in the preferred embodiment is the following set of eight binary digits: 11110000. This first code pattern P is transmitted 41½ times, for a total of 332 symbols. After the first code pattern P has been transmitted 41½ times, the second code pattern Q is transmitted twice, in phase with P. Since an extra half cycle of P was transmitted, the "in phase" requirement means that transmissions of Q begin in the middle of the second code pattern Q (i.e., 1111). (If an integral number of patterns P had been transmitted, Q transmissions would begin at the beginning of Q—i.e., 0000.) Second code pattern Q, in the preferred embodiment, is the complement of first code pattern P, that is, 00001111. The moment of synchronization is therefore encoded as the phase reversal occurring between the last transmission of first code pattern P and the first transmission of the second code pattern Q. After the second transmission of second code pattern Q, four field identification waveforms, each consisting of seven symbols, are transmitted. These waveforms, shown in Table 1, serve to identify which of 16 fields is being transmitted. (They may be used to synchronize encryption elements of the system.) Finally, symbol 455 is a 0. (It may be necessary to add an extra symbol on some lines in order to ensure that the rising edges of the first code patterns are in phase with a reference subcarrier transmitted in line 1 of the VBI. In the preferred embodiment, this occurs in fields 0, 3, 4, 7, 8, 11, 12 and 15 of the 16-field sequence. An extra zero is inserted immediately after symbol 78 in these fields.)

TABLE 1

| FIELD | FIELD ID WAVEFORMS | | | |
| --- | --- | --- | --- | --- |
| | FD 0 | FD 1 | FD 2 | FD 3 |
| 0 | 0101010 | 1010101 | 0101010 | 1010101 |
| 1 | 1010110 | 1010101 | 0101010 | 1010101 |
| 2 | 0101001 | 0101001 | 0101010 | 1010101 |
| 3 | 1010101 | 0101001 | 0101010 | 1010101 |
| 4 | 0101010 | 1010110 | 1010110 | 1010101 |
| 5 | 1010110 | 1010110 | 1010110 | 1010101 |
| 6 | 0101001 | 0101010 | 1010110 | 1010101 |
| 7 | 1010101 | 0101010 | 1010110 | 1010101 |
| 8 | 0101010 | 1010101 | 0101001 | 0101010 |
| 9 | 1010110 | 1010101 | 0101001 | 0101010 |
| 10 | 0101001 | 0101001 | 0101001 | 0101010 |
| 11 | 1010101 | 0101001 | 0101001 | 0101010 |
| 12 | 0101010 | 1010110 | 1010101 | 0101010 |
| 13 | 1010110 | 1010110 | 1010101 | 0101010 |
| 14 | 0101001 | 0101010 | 1010101 | 0101010 |
| 15 | 1010101 | 0101010 | 1010101 | 0101010 |

Figure 2:
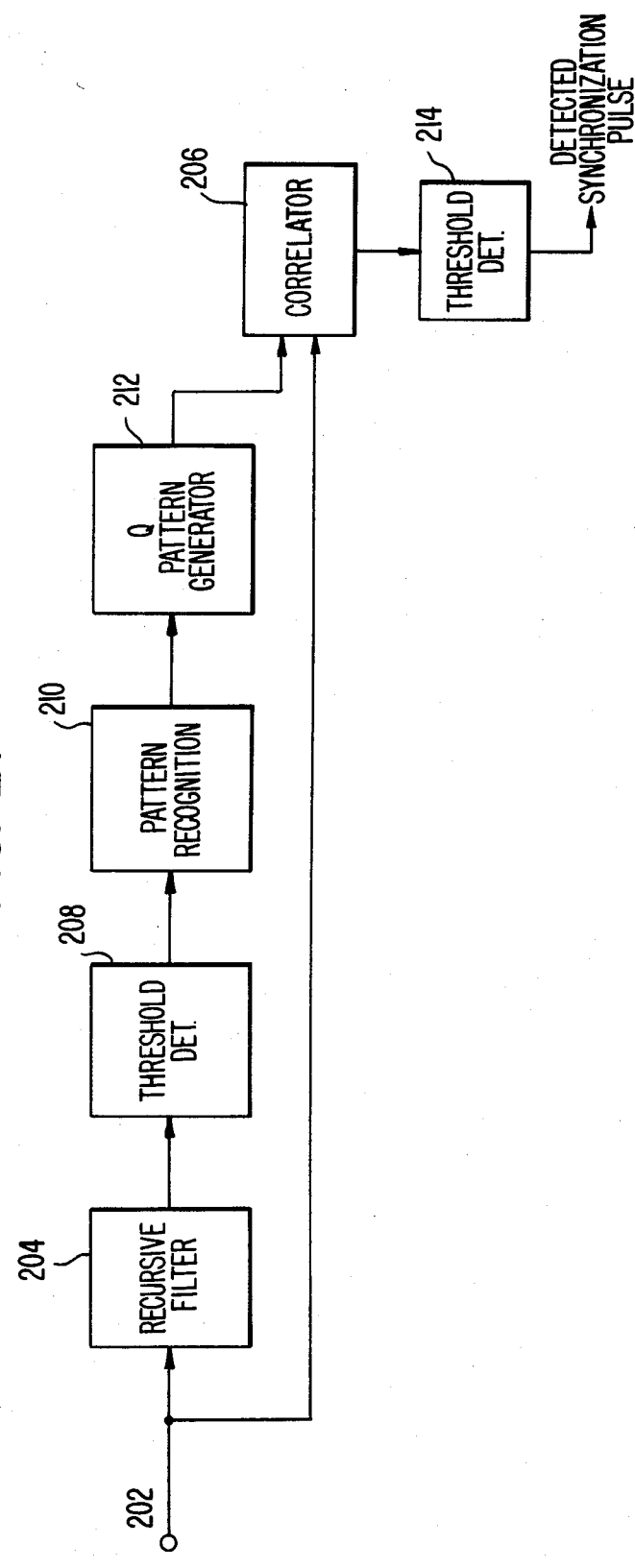
FIG. 2 is a simplified block diagram of the synchronization recovery apparatus.

FIG. 2 is a simplified block diagram of the synchronization recovery apparatus. The incoming signal, including line 2 of the VBI, enters terminal 202 and is sent to recursive filter 204 and correlator 206. When the first code pattern P is being received, recursive filter 204 builds at its output an image of first code pattern P of increasing amplitude and increasing signal/noise ratio. Recursive filter 204 will be described in greater detail below, and it is sufficient at this point to state that it may in general be any filter which has the characteristic of improving the signal/noise ratio of the first code pattern P with repeated transmissions of the pattern P. After several first code patterns P have been received, the amplitude at the output of recursive filter 204 builds to the critical level required to fire threshold detector 208.

Threshold detector 208 produces an output which is characteristic of the first code pattern P, an output which is recognized by pattern recognition circuit 210. In the preferred embodiment, the signal/noise ratio at the input of threshold detector 208 increases during the repeated transmissions of first code pattern P until threshold detector 208 exactly reproduces the first code pattern P. Pattern recognition circuit 210 then seeks an exact match between the output of threshold detector 208 and the first code pattern P. In alternate embodiments, threshold detector 208 and pattern recognition circuit 210 may be replaced with a correlator followed by a threshold detector executing a detection (e.g., a maximum likelihood detection) of the first code pattern P.

The output of pattern recognition circuit 210 initiates the local generation of, for example, second code pattern Q in a trial position appropriately phased with the incoming code signals. (Alternatively, it could initiate local generation of first code pattern P.) The generation of second code pattern Q is accomplished by a Q pattern generator 212 which, in the preferred embodiment, is simply an inverter, since Q is the compliment of P. The locally-generated second code pattern Q from Q generator 212 is input to correlator 206 for comparison with the received signal. Correlator 206 then calculates the match between second code pattern Q and successive portions of the incoming signal of a length equal to second code pattern Q. As can be expected, while the 41½ repetitions of first code pattern P are being received, the calculated correlation is negative. When the first of the second code patterns Q is received, however, a high positive correlation is calculated. This change in correlation is detected by threshold detector 214, the output of which is the decoded synchronization pulse. In the preferred embodiment, this pulse is used (sometimes indirectly) to reset system counters.

Figures 3, 4:
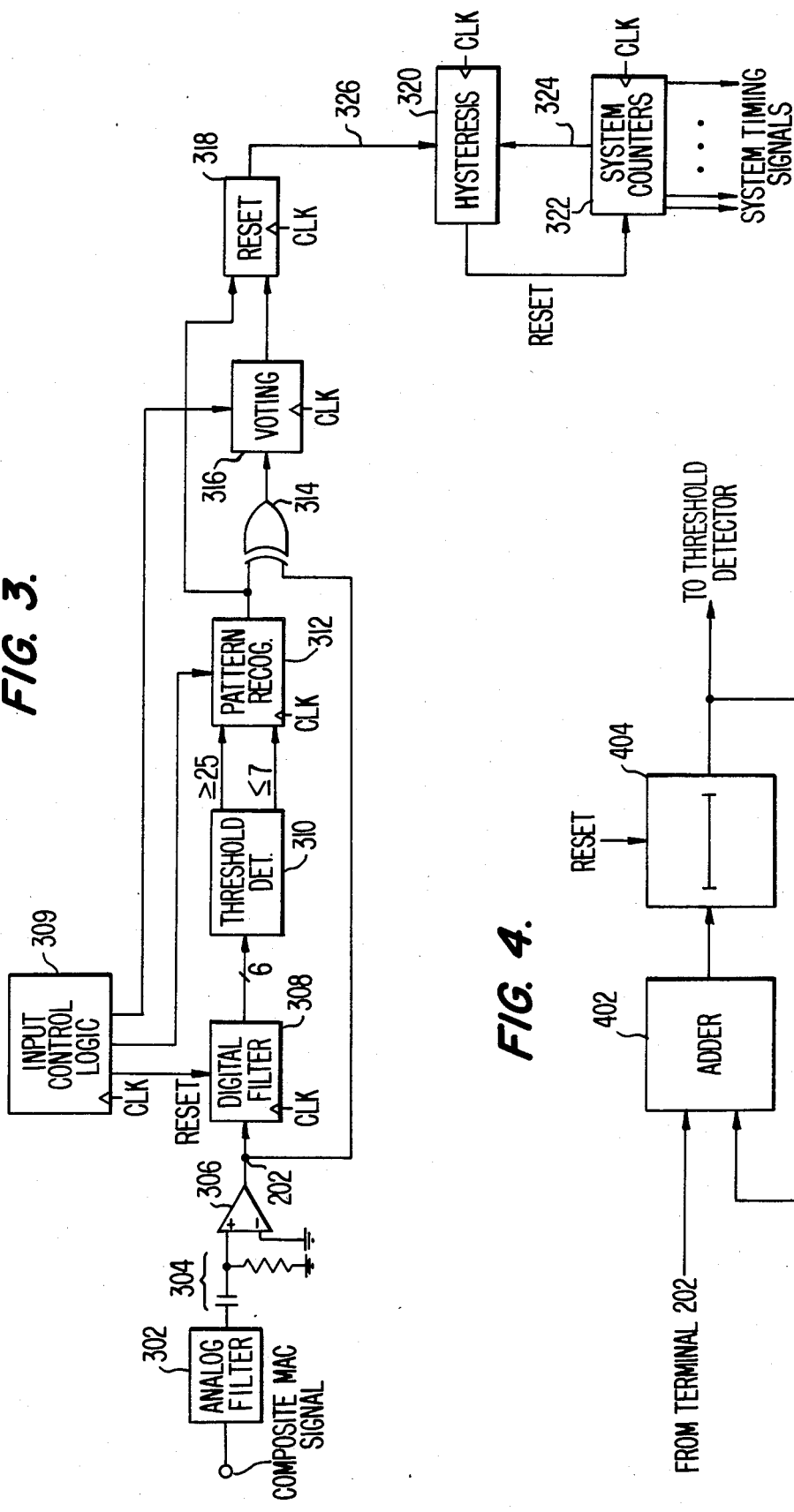
FIG. 3 is a more detailed block diagram of the preferred embodiment of the synchronization recovery apparatus.
FIG. 4 is a simplified block digram of a recursive filter.

FIG. 3 is a more detailed block diagram of the preferred embodiment of the synchronization recovery apparatus. The composite MAC signal (including the encoded synchronization pulse), although originating as a digital signal, is transmitted by radio in analog form. It is first filtered by analog filter 302, a bandpass filter tuned to 894.6 kHz, the frequency at which the code patterns P and Q occur (symbol frequency 7.157 MHz divided by 8 symbols per code pattern). Next, the signal is filtered and amplified by, respectively, high pass filter 304 and amplifier 306. The resulting signal is applied to input terminal 202.

The recursive filter is digital filter 308, an 8th-order digital bandpass filter tuned to 894.6 kHz. The poles of this filter lie exactly on the unit circle in the z-plane, resulting in an extremely narrow bandwidth and, hence, excellent noise rejection. Stability of the filter is maintained by periodically clearing its storage elements by means of input control logic circuit 309.

When the 894.6 kHz code patterns enter digital filter 308, its output tends to increase. After the first code pattern P has been applied to digital filter 308 for a period of time between 28 us and 46 us (depending on the level of noise) the output of the filter will have risen to a high enough level to trigger threshold detector 310 and activate pattern recognition circuit 312. As shown in FIG. 3, the threshold for detecting a "1" at the output of digital filter 308 is a value greater than or equal to 25 "1"s. The threshold value for detecting a "∅" at the output of digital filter 308 is a value less than or equal to 7. In 28 us digital filter 308 will have received 25 first code patterns P; therefore, in the absence of noise, the accumulated value for each of the four "1" positions of first code pattern P will have reached 25. In 46 us, all 41½ repetitions of the first code pattern P will have been received.

Pattern recognition circuit 312 performs two functions. First, it examines the outputs of threshold detector 310 to determine if they were produced as the result of the application of an 894.6 kHz signal at the input of the digital filter. This is simply a matter of determining whether eight samples of the "greater than"/"less than" signal (out of threshold detector 310) satisfy the following two criteria:

a. There must be exactly four "greater than" and four "less than"; and
 b. There must be either four "greater than" in a row or four "less than" in a row.

Once it has determined that the 894.6 kHz signal was present, pattern recognition circuit 312 begins locally generating its own version of the 894.6 kHz signal, that is, a series of first code patterns P. These patterns are input to exclusive-OR gate 314 along with the incoming signal from input terminal 202 in order to locate the phase reveasal (see FIG. 1) in the encoded synchronization signal.

When the phase reversal occurs, the output of exclusive-OR gate 314 will change from "∅" to "1". The output of exclusive-OR gate 314 drives serial 12-of-16 voting circuit 316, whose output is active high whenever 12 of the last 16 input samples were "1"s. In the absence of noise, the point at which the voting circuit's output becomes active high is fixed with respect to the composite MAC signal (if the original synchronization signal itself is fixed, as it is in the preferred embodiment). However, due to noise which introduces errors in the phase reversed section of the code word, the point at which the voting circuit's output becomes active high will not necessarily be fixed.

This situation is remedied by re-synchronizing the output of voting circuit 316 with the locally generated first code pattern P from pattern recognition circuit 312. This re-synchronization takes place in reset circuit 318. (Without reset circuit 318, the output of voting circuit 316 would be taken as the decoded synchronization signal. In the preferred embodiment, however, the decoded synchronization signal is taken from the output of reset circuit 318.) Reset circuit 318 combines two items of information necessary to recover a perfectly timed synchronization pulse. From pattern recognition circuit 312, it receives the locally-generated stream of first code patterns P. Because these patterns are error-free, they include error-free information on the exact point during each code pattern when the synchronization pulse could occur (mid-pattern). The only information missing is some identification of which code pattern will have the synchronization signal at its center, and this is provided by voting circuit 316. Pattern recognition circuit 312 therefore provides a one-bit-wide window, during each cycle of first code pattern P, during which the synchronization pulse may occur, given the correct state of voting circuit 316. The synchronization pulse is output by reset circuit in the one window which occurs during a code pattern when the voting circuit's output goes high.

The system described will regenerate accurately-timed synchronization pulses under poor signal conditions. Under even worse signal conditions, the range of operation of the system may be extended by introducing a regenerative circuit for replacing synchronization pulses which have been missed or incorrectly decoded due to excessive noise. (This extension may be achieved only if the transmitted synchronization pulses are periodic.)

One embodiment of a regenerative circuit employs a recursive filter in identical form to recursive filter 204 followed by a threshold detector similar to threshold detector 208. The period of recursion of the filter would then correspond to the period of the transmitted synchronization signal.

In the preferred embodiment, the decoded synchronization pulse from reset circuit 318 is used indirectly to reset system counters as shown in FIG. 3. System counters 322 operate continuously and automatically reset to 0 periodically, the period being nominally the same as the period of the transmitted synchronization pulses. When the system counters are reset to 0, they develop a system synchronization pulse on line 324 which is compared with the decoded synchronization pulse on line 326. Comparison takes place in hysteresis circuit 320, which counts the number of occasions when system synchronization and decoded synchronization do not coincide. When the count reaches a predetermined value (5 in the preferred embodiment), the next decoded synchronization signal is used to reset the system counters. If the count is below the predetermined value, the decoded synchronization signal is not used to reset the system counters; they are allowed to reset automatically. This arrangement causes undetected synchronization signals to be regenerated by the system counters and causes synchronization signals which are occasionally incorrectly detected (i.e., detected when no synchronization word was transmitted) to be ignored.

FIG. 4 is a simplified block diagram of a recursive filter. The encoded synchronization signal arriving from terminal 202 is added in adder 402 to a feedback signal derived from the output of the recursive filter. The sum is delayed in delay line 404, which implements a delay equal to the duration of the first or second code pattern (which are of equal duration). The output of delay line 404 is input to the threshold detector and also fed back, through unity gain amplifier 406, to adder 402. In the preferred embodiment, where the recursive filter is digital filter 308, delay line 404 is a shift register array.

Figure 5:
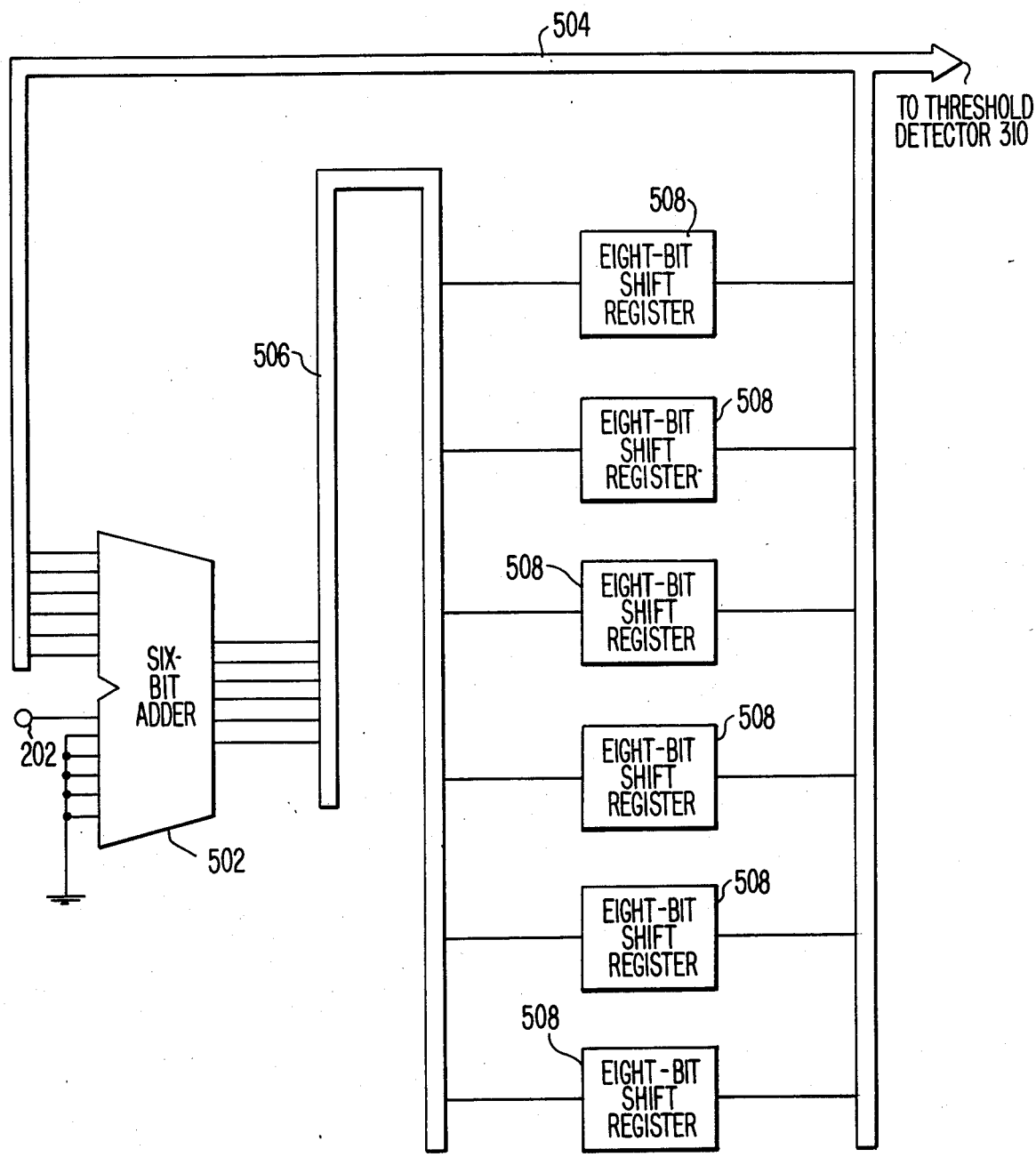
FIG. 5 is a block diagram of digital filter 308 shown in FIG. 3.

FIG. 5 is a block diagram of digital filter 308. The incoming signal enters terminal 202 serially and is added, in six-bit adder 502, to the signal on output bus 504. The sum is transferred, via input bus 506, to six eight-bit shift registers 508, where it is delayed by the length of a code pattern (eight bits) before being output to threshold detector 310 via output bus 504, which also feeds the sum back to input adder 502.

By using eight-bit shift registers, digital filter 308 is, in effect, dividing the incoming signal into eight-bit portions (portions of the same length as the code patterns). Adder 502 then adds each digit of the incoming eight-bit portion to the corresponding digit of the sum on output bus 504. For example, the sum of bits in the third position of all previously-received eight-bit portions may be twelve. If the corresponding bit (i.e., the third bit) of the next eight-bit portion is a "1," the sum will change to thirteen.

Threshold detector 310 then compares each of the eight sums of corresponding digits with a threshold. In the preferred embodiment, there are actually two thresholds, 7 and 25. If the sum under consideration is less than or equal to 7, threshold detector 310 outputs a "0" on the "greater than" line and a "1" on the "less than" line. If the sum is greater than or equal to 25, a "1" is output on the "greater than" line and a "∅" on the "less than" line. If the sum is between 7 and 25, "∅"s are output on both lines from threshold detector 310.

Figure 6:
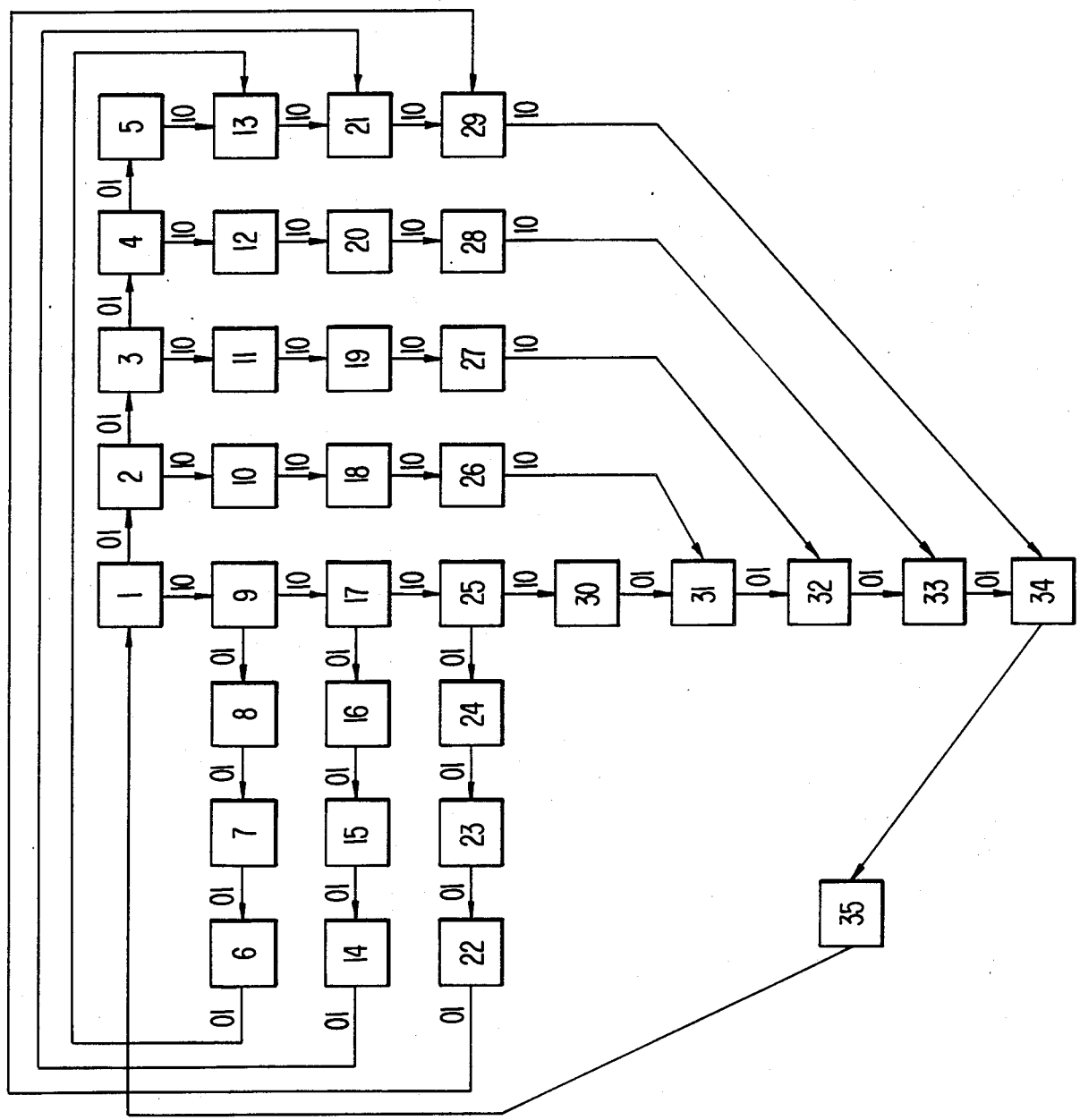
FIG. 6 is a state diagram for pattern recognition circuit 312 shown in FIG. 3.

FIG. 6 is a state diagram for pattern recognition circuit 312. As noted above, pattern recognition circuit 312 monitors the outputs of threshold detector 310 to determine whether one of the following eight combinations of eight binary digits has been repeatedly input to digital filter 308:

| 1 | 1 | 1 | 1 | ∅ | ∅ | ∅ | ∅ |
|---|---|---|---|---|---|---|---|
| ∅ | 1 | 1 | 1 | 1 | ∅ | ∅ | ∅ |
| ∅ | ∅ | 1 | 1 | 1 | 1 | ∅ | ∅ |
| ∅ | ∅ | ∅ | 1 | 1 | 1 | 1 | ∅ |
| ∅ | ∅ | ∅ | ∅ | 1 | 1 | 1 | 1 |
| 1 | ∅ | ∅ | ∅ | ∅ | 1 | 1 | 1 |
| 1 | 1 | ∅ | ∅ | ∅ | ∅ | 1 | 1 |
| 1 | 1 | 1 | ∅ | ∅ | ∅ | ∅ | 1 |

The boxes numbered from 1 to 35 in FIG. 6 are the states in which pattern recognition circuit 312 may exist, while the arrows represent transitions between states. The pairs of digits (i.e., 01 or 10) next to most of the transition arrows indicate the values, at the two outputs of threshold detector 310, necessary for the indicated transition to occur. The values are listed in the order "greater than," then "less than". For example, if pattern recognition circuit 312 is in state 17, it will transition to state 16 if the "greater than" output of threshold detector 310 is a "∅" and the "less than" output is a "1". On the other hand, if the "greater than" output is a "1" and the "less than" output is a "∅", pattern recognition circuit 312 will transition instead to state 25. The circuit begins in state 35 and waits there until an active low gating signal causes it to transition to state 1; and it waits in state 1 until the gating signal switches to the active high logic level. State 34 is the final state reached when one of the above eight combinations has been detected. In state 34, pattern recognition circuit 312 outputs a flag (to begin local generation of a series of first code patterns P) and transitions to state 35, to await the next active low gating signal. If both the "greater than" and the "less than" outputs of threshold detector 310 are "∅", then there have been too few first code patterns received by digital filter 308 to be discernible above the noise. If both outputs of threshold detector 310 are "1" (an unlikely event), the storage elements of digital filter 308 need to be cleared.

Although illustrative embodiments of the present invention have been described in detail with reference to the accompanying drawings, it is to be understood that the invention is not limited to those precise embodiments, and that various changes and modifications may be effected therein by one skilled in the art without departing from the scope or spirit of the invention. For example, the code patterns P and Q need not be contiguous. Random waveforms may be introduced within the encoded synchronization signal provided these random waveforms are of known position and duration and can be ignored by the receiver.

What is claimed is:

1. A method of detecting a synchronizing signal encoded as m identical first code patterns (P) followed by n identical second code patterns (Q), each of the first and second code patterns being of the same predetermined duration as, and in phase with, each other, the first code pattern (P) being different from the second code pattern (Q), where m and n are positive real numbers and m is greater than one, said method comprising the steps of:

receiving the encoded synchronizing signal;
identifying an occurence of the first code pattern (P) in the received signal;
locally generating, in a predetermined phase relationship with the identified occurence of the first code pattern, a plurality of representations of either the first code pattern or the second code pattern;
comparing the received signal with the locally generated representations; and
detecting a change in the comparison as the synchronizing signal.

2. The method of claim 1 wherein said step of identifying an occurrence of the first code pattern comprises:
dividing the received signal into portions, each portion having the predetermined duration;
adding a plurality of the portions;
comparing the sum of the portions with the first code pattern; and
determining, based on the comparison, the existence of the first code pattern in the received signal.

3. The method of claim 1 wherein the first code pattern (P) and the second code pattern (Q) are different than each other.

4. A method of detecting a synchronizing signal encoded as m identical first binary code words (P) followed by n identical second binary code words (Q), each of the first and second code words having the same predetermined number of digits as, and being in phase with, each other, the first binary code word (P) being the complement of the second binary code word (Q), where m and n are positive real numbers and m is greater than one, said method comprising the steps of:

receiving the encoded synchronizing signal;
dividing the received signal into portions, each portion having the predetermined number of digits;
adding corresponding digits of a plurality of the portions;
comparing each sum of corresponding digits of the portions with the corresponding digit of the first binary code word;
determining, based on the comparisons, the existence of the first binary code word in the received signal;
locally generating, in phase with the received first binary code words, a plurality of either the first or the second binary code words;
correlating the received signal with the locally generated binary code words; and
detecting a change in the correlation as the synchronizing signal.

5. In a communication system having a transmitter to transmit a message and a receiver to receive the message, the receiver requiring synchronization with the transmitter, an encoded electrical synchronizing signal comprising:
m identical first electrical waves each having a predetermined duration; and
n identical second electrical waves following said first electrical waves and in phase with said first electrical waves, each of said second electrical waves having the predetermined duration; wherein
said second electrical wave is different than said first electrical wave, m and n are positive real numbers, and m is greater than one, said synchronizing signal being compared by the receiver to a locally generated electrical wave, in order to synchronize the receiver with the transmitter.

6. A communication system according to claim 5 wherein said locally generated signal comprises representations of either said first or second electrical waves.

7. Apparatus for detecting a synchronizing pulse encoded as m identical first code patterns (P) followed by n identical second code patterns (Q), each of the first and second code patterns being of the same predetermined duration as, and in phase with, each other, the m identical first code patterns being of a first waveform and the n identical second code patterns being of a second waveform different from the first waveform, where m and n are positive real numbers and m is greater than one, said apparatus comprising:

input means for receiving the encoded synchronization pulse;
identification means coupled to said input means for identifying the first waveform in the received signal;
signal generating means coupled to said identification means for locally generating, in a predetermined phase relationship with the identified first waveform, representations of either the first or the second waveform;
comparison means for comparing the received signal with the locally generated representations; and
detection means for detecting a change in the comparison as the synchronization pulse.

8. The apparatus of claim 7 wherein said identification means comprises:
addition means coupled to said input means for adding a plurality of portions of the received signal, each of the portions having the predetermined duration; and
pattern recognition means coupled to said addition means for comparing the sum of the portions with the first waveform and for determining, based on the comparison, the existence of the first waveform in the received signal.

9. In a communication system having a transmitter to transmit a message and a receiver to receive the message, the receiver requiring synchronization with the transmitter, means for generating a synchronization signal adapted to be received by said receiver, said generating means comprising:
means for generating m identical first electrical waves each having a predetermined duration; and
means for generating n identical second electrical waves following said first electrical waves and in phase with said first electrical waves, each of said second electrical waves having the predetermined duration; wherein
said second electrical wave is different than said first electrical wave, m and n are real positive numbers, and m is greater than one; and wherein
said receiver compares said synchronization signal with a locally generated signal to thereby synchronize the receiver with the transmitter.

10. A communication system according to claim 9 wherein said locally generated signal comprises representations of either said first or second electrical waves.

11. In a communication system having a transmitter to transmit a message and a receiver to receive the message, the receiver requiring synchronization with the transmitter, a method of generating a synchronization signal adapted to be received by said receiver, said method comprising the steps of:

generating m identical first electrical waves each having a predetermined duration; and generating n identical second electrical waves following said first electrical waves and in phase with said first electrical waves, each of said second electrical waves having the predetermined duration; wherein said second electrical wave is different than said first electrical wave, m and n are real positive numbers, and m is greater than one; and wherein said receiver compares said synchronization signal with a locally generated signal to thereby synchronize the receiver with the transmitter.

12. A communication system according to claim 11 wherein said locally generated signal comprises representations of either said first or second electrical waves.

13. In a communication system having a transmitter to transmit a message and a receiver to receive the message, the receiver requiring synchronization with the transmitter, an encoded electrical synchronizing signal comprising:

m identical first electrical waves each having a predetermined duration; and n identical second electrical waves following said first electrical waves and in phase with said first electrical waves, each of said second electrical waves having the predetermined duration; wherein said second electrical wave is different than said first electrical wave, m and n are positive real numbers, and m is greater than one, said synchronizing signal being used by the receiver to synchronize the receiver with the transmitter; and wherein said receiver divides said encoded electrical synchronizing signal into portions of said predetermined duration, adds a plurality of the portions, compares each sum with the first electrical wave, and determines, based on the comparisons, the existence of the first electrical wave in the synchronizing signal.

* * * * *